US012573732B2

(12) United States Patent
Liao

(10) Patent No.: US 12,573,732 B2
(45) Date of Patent: Mar. 10, 2026

(54) ELECTRODE AND ELECTROCHEMICAL APPARATUS

(71) Applicant: XIAMEN HITHIUM ENERGY STORAGE TECHNOLOGY CO., LTD., Fujian (CN)

(72) Inventor: Linping Liao, Fujian (CN)

(73) Assignee: XIAMEN HITHIUM ENERGY STORAGE TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 19/173,754

(22) Filed: Apr. 8, 2025

(65) Prior Publication Data
US 2025/0239750 A1     Jul. 24, 2025

Related U.S. Application Data

(63) Continuation of application No. PCT/CN2023/123247, filed on Oct. 7, 2023.

(30) Foreign Application Priority Data

Oct. 8, 2022     (CN) .......................... 202211224335.2

(51) Int. Cl.
| | |
|---|---|
| *H01M 4/1397* | (2010.01) |
| *H01M 4/36* | (2006.01) |
| *H01M 4/58* | (2010.01) |
| *H01M 4/62* | (2006.01) |
| *H01M 10/42* | (2006.01) |

(Continued)

(52) U.S. Cl.
CPC ....... *H01M 50/586* (2021.01); *H01M 4/1397* (2013.01); *H01M 4/366* (2013.01); *H01M*

*4/58* (2013.01); *H01M 4/621* (2013.01); *H01M 4/625* (2013.01); *H01M 10/4235* (2013.01);

(Continued)

(58) Field of Classification Search
None
See application file for complete search history.

(56) References Cited

U.S. PATENT DOCUMENTS

| | | | |
|---|---|---|---|
| 2015/0236318 A1* | 8/2015 | Katayama | ........... H01M 50/403 427/126.4 |
| 2015/0243964 A1 | 8/2015 | Yu et al. | |

FOREIGN PATENT DOCUMENTS

| | | |
|---|---|---|
| CN | 109244362 | 1/2019 |
| CN | 109244475 | 1/2019 |

(Continued)

OTHER PUBLICATIONS

CNIPA, First Office Action for CN Application No. 202211224335.2, Apr. 26, 2024.

(Continued)

*Primary Examiner* — Zhongqing Wei
(74) *Attorney, Agent, or Firm* — Hodgson Russ LLP

(57) ABSTRACT

An electrode and an electrochemical apparatus are provided. The electrode includes a current collector, an active layer, and an insulation layer. The active layer is coated on at least one surface of the current collector. The insulation layer is coated on the at least one surface of the current collector and connected to a periphery of the active layer. The insulation layer includes a water-based binder and an inorganic material, and a peel strength of the insulation layer after being immersed in water for 1 minute at a preset temperature is less than or equal to 7N/m.

20 Claims, 3 Drawing Sheets

<u>10</u>

(51) Int. Cl.
    *H01M 10/54*     (2006.01)
    *H01M 50/586*     (2021.01)
    *H01M 4/02*     (2006.01)
    *H01M 10/0525*     (2010.01)

(52) U.S. Cl.
    CPC ...... *H01M 10/54* (2013.01); *H01M 2004/028*
        (2013.01); *H01M 10/0525* (2013.01)

(56)           References Cited

FOREIGN PATENT DOCUMENTS

| | | |
|---|---|---|
| CN | 209465279 | 10/2019 |
| CN | 113410421 | 9/2021 |
| CN | 113597687 | 11/2021 |
| CN | 113632273 | 11/2021 |
| CN | 113711396 | 11/2021 |
| CN | 113939927 | 1/2022 |
| CN | 113939927 A * | 1/2022 |
| CN | 114583100 | 6/2022 |
| CN | 114744139 | 7/2022 |
| CN | 114744139 A * | 7/2022 |
| CN | 115425174 | 12/2022 |
| KR | 20150045786 | 4/2015 |
| KR | 20200096051 | 8/2020 |

OTHER PUBLICATIONS

CNIPA, Notification to Grant Patent Right for Invention for CN Application No. 202211224335.2, Jun. 3, 2024.
WIPO, International Search Report and Written Opinion for International Application No. PCT/CN2023/123247, Nov. 20, 2023.

\* cited by examiner

10

10

ELECTRODE AND ELECTROCHEMICAL APPARATUS

CROSS-REFERENCE TO RELATED APPLICATIONS

The application is a continuation of International Application No. PCT/CN2023/123247, filed Oct. 7, 2023, which claims priority to Chinese Patent Application No. 202211224335.2, filed Oct. 8, 2022, the entire disclosures of which are incorporated herein by reference.

TECHNICAL FIELD

The present disclosure relates to the field of energy storage apparatus, and in particular, to an electrode and an electrochemical apparatus.

BACKGROUND

Lithium-ion batteries have been widely used in fields such as communication equipment and new energy vehicles due to their advantages of high energy density, light weight, and long service life. However, due to the limited cycle life of the lithium-ion batteries, a large number of spent lithium-ion batteries are generated annually. These spent lithium-ion batteries contain a significant amount of non-renewable and economically valuable metal resources (e.g., aluminum foil or copper foil that can be used as a current collector). Therefore, effective recycling of the spent lithium-ion batteries has high economic benefits.

SUMMARY

In an aspect of the disclosure, an electrode is provided. The electrode includes a current collector, an active layer, and an insulation layer. The active layer is coated on at least one surface of the current collector. The insulation layer is coated on the at least one surface of the current collector and connected to a periphery of the active layer. The insulation layer includes a water-based binder and an inorganic material, and a peel strength of the insulation layer after being immersed in water for 1 minute at a preset temperature is less than or equal to 7N/m.

In an aspect of the disclosure, an electrochemical apparatus is provided. The electrochemical apparatus includes a positive electrode, a negative electrode, a separator, and an electrolyte. The positive electrode and/or the negative electrode is the electrode in an aspect of the disclosure.

BRIEF DESCRIPTION OF THE DRAWINGS

In order to explain the technical solution of the embodiments of the disclosure more clearly, the following will briefly introduce the accompanying drawings required in the embodiments.

Figure 1:
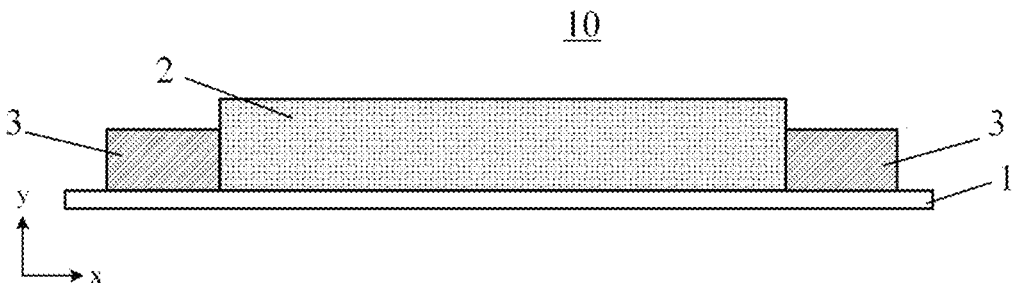
FIG. 1 is a schematic structural view of an electrode provided in an embodiment of the disclosure.

Reference signs: electrode 10; current collector 1; active layer 2; first active layer 21; second active layer 22; insulation layer 3; second surface 31; first surface 32; electrochemical apparatus 100; positive electrode 110; negative electrode 120; separator 130; electrolyte 140.

DETAILED DESCRIPTION

Lithium-ion batteries have been widely used in fields such as communication equipment and new energy vehicles due to their advantages of high energy density, light weight, and long service life. However, due to the limited cycle life of the lithium-ion batteries, a large number of spent lithium-ion batteries are generated annually. These spent lithium-ion batteries contain a significant amount of non-renewable and economically valuable metal resources (e.g., aluminum foil or copper foil that can be used as a current collector). Therefore, effective recycling of the spent lithium-ion batteries has high economic benefits.

In existing technologies, insulation layers located at edges of current collectors for preventing short circuits in lithium-ion batteries generally use polyvinylidene fluoride (PVDF) as a binder and N-methylpyrrolidone (NMP) as a solvent. However, during the recycling process of electrodes containing the PVDF, it is found that the insulation layers at the edges of the current collectors are difficult to be peeled off from the current collectors, making it challenging to fully and efficiently recycle the current collectors. In existing recycling solutions for electrodes containing the PVDF, an additional edge trimming process is generally required to remove the insulation layers during the recycling process of the current collectors. This recycling method not only reduces the recycling rate of the current collectors but also increases the cost of recycling. Additionally, the NMP possesses a certain toxicity and may cause environmental pollution. Therefore, how to prepare electrodes with high recycling rate is an urgent problem to be solved by those skilled in the art.

In view of this, the disclosure provides an electrode that can fundamentally solve the aforementioned problems.

Figure 2:
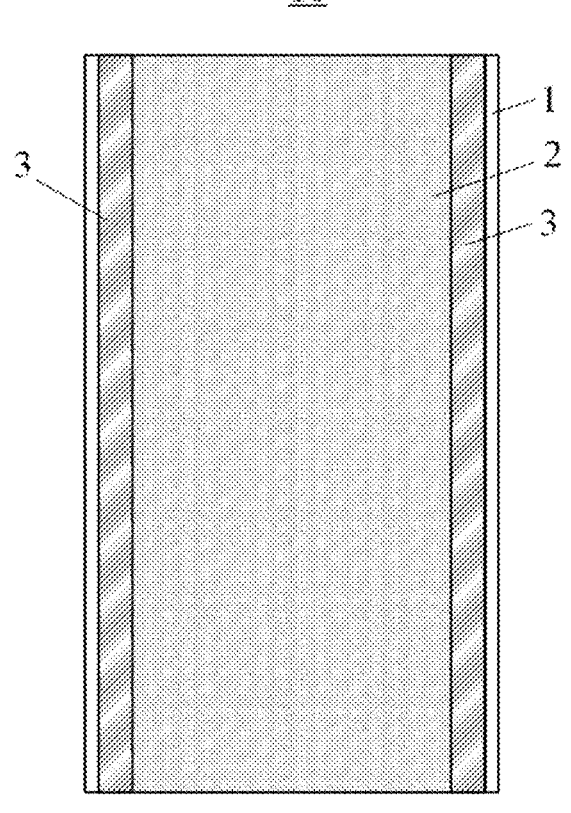
FIG. 2 is a schematic structural view of an electrode provided in another embodiment of the disclosure.

Reference is made to FIG. 1 and FIG. 2. FIG. 1 is a schematic structural view of an electrode provided in an embodiment of the disclosure, and the schematic structural view of the electrode is a cross-sectional view. FIG. 2 is a schematic structural view of an electrode provided in another embodiment of the disclosure, and the schematic structural view of the electrode is a top view. As illustrated in FIG. 1 and FIG. 2, an electrode 10 may include a current collector 1, an active layer 2, and an insulation layer 3. The active layer 2 may be coated on at least one surface of the current collector 1. The insulation layer 3 may also be coated on the at least one surface of the current collector 1 and connected to a periphery of the active layer 2.

It may be understood that, in the aforementioned electrode 10, there is neither overlap nor gaps between the active layer 2 and the insulation layer 3. Since the active layer 2 and the insulation layer 3 form a mutually fitted structure, short circuits of the electrode 10 caused by punctures can be effectively prevented, thereby improving the safety of an electrochemical apparatus. Additionally, the structure of the aforementioned electrode 10 helps improving the flatness and stability of rolling the electrode 10 while preventing short circuits caused by punctures, avoiding the risk of overpressure during cold-pressing of the electrode 10, and thus ensuring the performance of the electrochemical apparatus.

In the electrode provided in the disclosure, the peel strength of the insulation layer after being immersed in water for 1 minute at a preset temperature is less than or equal to 7N/m. The preset temperature is a temperature set in advance, and the specific value of the temperature can be determined according to actual environmental temperature or practical requirements. For example, the preset temperature may be 0-40° C. In some specific embodiments, the preset temperature may be 0° C., 10° C., 15° C., 20° C., 25° C., 30° C., 35° C., 40° C., etc., but the preset temperature is not limited to the listed values. Other unlisted values within this numerical range are also applicable. Therefore, it demonstrates that during the recycling process of the electrode of the disclosure, the insulation layer can be easily peeled off from the current collector through water immersion. This recycling process is cost-effective and environmental friendly, and the recycling rate of the current collector is high, resulting in high recycling rate of the electrode. Furthermore, the insulation layer of the disclosure can achieve a peel strength of less than or equal to 4N/m after being immersed in water for 1 minute at 25° C., further demonstrating that a simple and efficient recycling of the current collector can be achieved during the recycling process of the electrode of the disclosure.

It may be understood that, the electrode may be a positive electrode or a negative electrode. When the electrode is a positive electrode, correspondingly, the current collector is a positive electrode current collector (e.g., aluminum foil and the like) and the active layer is a positive electrode active layer. When the electrode is a negative electrode, correspondingly, the current collector is a negative electrode current collector (e.g., copper foil and the like) and the active layer is a negative electrode active layer.

The active layer of the electrode typically includes an electrode active material, a binder, and a conductive agent. However, the active layer may also include optional additives or auxiliaries as needed, such as a lithium supplement agent, etc. Specifically, a slurry including the electrode active material, the conductive agent, the binder, and the like is coated on at least one surface of the current collector. The coating may be single-layer coating or multi-layer coating, which is not limited in the disclosure. After drying and other post-treatments, the active layer of the disclosure is obtained.

For the positive electrode, various positive electrode active materials commonly used in the field may be selected. In some specific embodiments, the positive electrode active material may be selected from at least one of lithium iron phosphate, lithium manganese oxide, lithium cobalt oxide, nickel-cobalt-manganese ternary material, and nickel-cobalt-aluminum ternary material, etc., which is not limited in the disclosure. For the negative electrode, various negative electrode active materials commonly used in the field may be selected. In some specific embodiments, the negative electrode active material may be selected from at least one of graphite, lithium titanate, and silicon-carbon composite material, etc., which is not limited in the disclosure.

The conductive agent in the active layer may include at least one member selected from the group consisting of conductive carbon material and metal material. In some specific embodiments, the conductive carbon material includes at least one member selected from the group consisting of zero-dimensional conductive carbon such as acetylene black and conductive carbon black (Super-P), one-dimensional conductive carbon such as carbon nanotube, two-dimensional conductive carbon such as conductive graphite and graphene, and three-dimensional conductive carbon such as reduced graphene oxide. The metal material is at least one member selected from the group consisting of aluminum powder, iron powder, and silver powder. To prevent difficulties in peeling off the current collector from the active layer during the recycling process, the binder in the active layer may be the same water-based binder in the insulation layer. The specific types of the water-based binder can be referred to in the following description and will not be repeated here.

The insulation layer of the electrode includes the water-based binder and the inorganic material. However, the insulation layer may also include optional additives or auxiliaries as needed, such as a dispersant, etc.

The water-based binder may include hydrophilic groups. In some specific embodiments, the hydrophilic groups may include, but are not limited to, at least one of hydroxyl group, carboxyl group, and cyano group, etc. It may be understood that, the disclosure utilizes the hydrophilicity of the hydrophilic groups in the water-based binder, enabling the insulation layer to be easily peeled off from the current collector through water immersion during the recycling process of the electrode, thereby achieving full and efficient recycling of the current collector.

Figure 3:
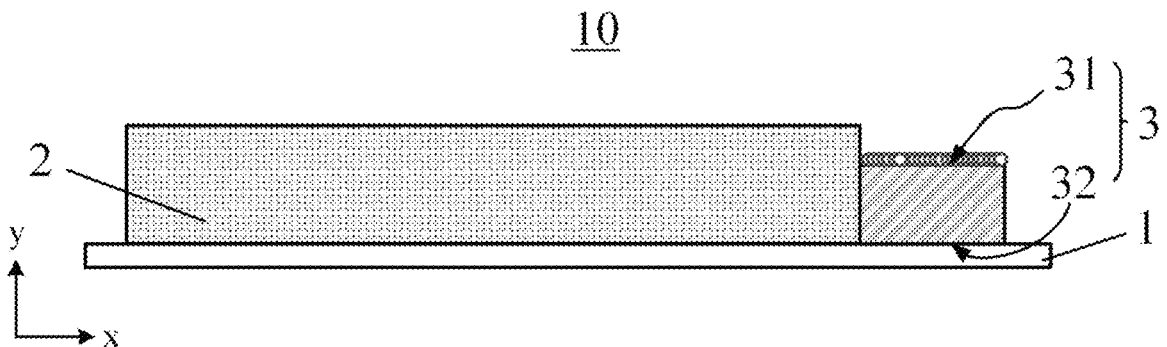
FIG. 3 is a schematic structural view of an electrode provided in another embodiment of the disclosure.

As illustrated in FIG. 3, in one possible embodiment, the insulation layer 3 of the electrode 10 may have a second surface 31 and a first surface 32 facing away from each other.

The insulation layer 3 is bonded to at least one surface of the current collector 1 through the first surface 32, and at least part of the hydrophilic groups in the water-based binder is exposed from the second surface 31. It may be understood that, when recycling the electrode 10 through water immersion, the second surface 31 of the insulation layer 3 away from the current collector 1 first comes into contact with the water. The part of the hydrophilic groups exposed from the second surface 31 reacts with the water, causing the water-based binder in the insulation layer 3 to be quickly dissolved in the water, thereby achieving efficient peeling of the insulation layer 3 from the current collector 1. In this way, a high recycling rate of the electrode 10 is ensured.

Figure 4:
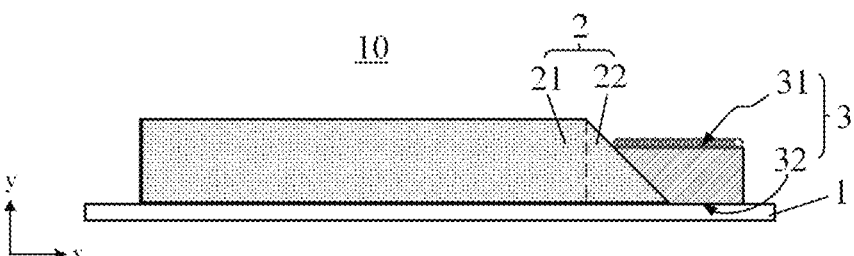
FIG. 4 is a schematic structural view of an electrode provided in another embodiment of the disclosure.
Figure 5:
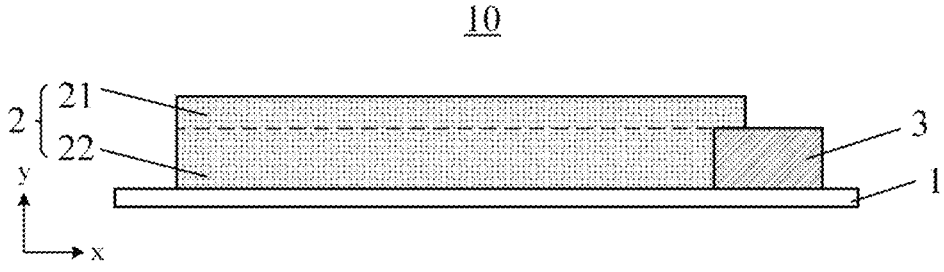
FIG. 5 is a schematic structural view of an electrode provided in another embodiment of the disclosure.

Reference is made to FIG. 4 and FIG. 5. In some possible embodiments, the active layer 2 may include a first active layer 21 and a second active layer 22 connected to each other. Part of the insulation layer 3 covers at least part of the second active layer 22. In some possible embodiments, the first active layer 21 and the second active layer 22 may be made of the same material. For example, the first active layer 21 and the second active layer 22 contain the same active material. The specific selection of the active material can be referred to in the above description and will not be repeated here. Additionally, the first active layer 21 and the second active layer 22 may also be of an integrated structure, which can improve the coating efficiency of the active layer 2, thereby improving the processing efficiency of the electrode 10. However, in other possible embodiments, the first active layer 21 and the second active layer 22 may be made of different materials, such that the energy density of the second active layer 22 connected to the insulation layer 3 is lower than the energy density of the first active layer 21. When the electrode 10 is subject to collision or puncture, the second active layer 22 can increase the contact resistance between the current collector and other contacting objects, thereby reducing the risk of short circuits of the electrode 10. Furthermore, in the electrode provided in the disclosure, part of the insulation layer 3 covers at least part of the second active layer 22, so that exposure of the current collector 1 at the junction of the two layers may be avoided, and the coverage of the insulation layer 3 on the current collector 1 is ensured, further improving the safety performance of the electrode 10.

Reference is made to FIG. 4. In some possible embodiments, the first active layer 21 and the second active layer 22 may be arranged along a length direction x of the electrode 10, and the thickness of the second active layer 22 gradually decreases in a direction away from the first active layer 21. It may be understood that, during the rolling process, from one end of the current collector 1, a pressure roller acts sequentially on the second active layer 22 and the first active layer 21 along the length direction x. Since the thickness of the second active layer 22 gradually decreases in the direction away from the first active layer 21, the rolling pressure applied by the pressure roller on the second active layer 22 gradually decreases, thereby alleviating the rolling pressure on the second active layer 22 and reducing the probability of powder shedding in the second active layer 22, further improving the safety performance of the electrode 10. Additionally, as the thickness of the second active layer 22 decreases in the direction away from the first active layer 21, the second surface 31 of the insulation layer 3 is larger than the first surface 32 along the length direction x, increasing the hydrophilic groups on the second surface 31. When recycling the electrode 10 through water immersion, the second surface 31 with more hydrophilic groups first comes into contact with the water, thereby achieving efficient peeling of the insulation layer 3 from the current collector 1, ensuring a high recycling rate of the electrode 10.

Reference is made to FIG. 5. In some possible embodiments, the first active layer 21 and the second active layer 22 may be arranged along a thickness direction y of the electrode 10, with the second active layer 22 connected to the current collector 1 and the first active layer 21 away from the current collector 1. At least part of the surface of the insulation layer 3 away from the current collector 1 is covered by the surface of the first active layer 21 near the second active layer 22. In this way, the insulation layer is allowed to be more tightly connected to the first active layer and the second active layer, making it difficult for the insulation layer 3 to be peeled off even under strong external forces such as puncture or collision, preventing exposure of the current collector 1, and making the electrode 10 safer.

The mass percentage of the hydrophilic groups may be greater than or equal to 50% of the total mass of the water-based binder. It may be understood that, when the mass percentage of the hydrophilic groups in the water-based binder is excessively low, the peel strength between the current collector and the insulation layer in the electrode after being immersed in water remains high, which is not conducive to peeling off the insulation layer from the current collector, resulting in low recycling efficiency and lower recycling purity of the current collector.

In some specific embodiments, the water-based binder includes polymers formed by polymerization of at least one monomer of methyl methacrylate, ethyl methacrylate, acrylonitrile, ethyl acrylate, n-butyl acrylate, acrylamide, N-hydroxymethylacrylamide, acetoacetoxyethyl methacrylate, acrylic acid, acrylate esters, etc., which is not limited in the disclosure. The weight-average molecular weight of the water-based binder may be 400,000-900,000. It may be understood that, when the weight-average molecular weight of the water-based binder is excessively small, viscosity of a slurry may be excessively low, leading to a poor film-forming property of the slurry and a possible incomplete coating of an insulation layer slurry. When the weight-average molecular weight of the water-based binder is excessively large, a thickening effect of the water-based binder may be enhanced, leading to excessively high viscosity and poor fluidity of the slurry, affecting the dispersion of the insulation layer slurry.

The thickness of the insulation layer of the electrode may be 40-100 μm. It may be understood that, the active layer of the disclosure may be thick-coated. Therefore, when the thickness of the insulation layer is excessively small, the strength of the insulation layer may be excessively low, which may affect the insulating performance. When the thickness of the insulation layer is excessively large, the relative content of active material in the electrode decreases, which may affect the energy density of the electrochemical apparatus.

Additionally, the initial peel strength of the insulation layer can reach 20-150N/m, indicating that the water-based binder used in the disclosure has excellent bonding effects.

In some specific embodiments, the inorganic material includes at least one of boehmite, alumina, insulating carbon black, magnesium oxide, silicon oxide, zirconium oxide, and calcium oxide, etc., which is not limited in the disclosure. The average particle size D50 of the inorganic material may be 0.3-20 μm. It may be understood that, when the average particle size D50 of the inorganic material is excessively small, the specific surface area will be excessively large, which may affect the peel strength and make it difficult to peel off during the recycling process. When the average particle size D50 of the inorganic material is excessively large, the formed insulation layer may be brittle, which may affect the insulating effect and causing significant damage to the current collector during coating.

It may be understood that, D50 refers to a corresponding particle size when a cumulative volume fraction of the inorganic material reaches 50% in a volume-based distribution, i.e., the median particle size in the volume-based distribution. The particle size of the inorganic material can be measured using a laser diffraction particle size analyzer (e.g., a Malvern Mastersizer 3000).

The mass percentage of the water-based binder may be 8-20% of the total mass of the insulation layer, and the mass percentage of the inorganic material may be 80-92% of the total mass of the insulation layer. It may be understood that, when the content of the water-based binder is excessively low, the insulation layer has poor film-forming property, which is not conducive to improving the coverage of the insulation layer. When the content of the water-based binder is excessively high, high viscosity of the water-based binder may intensify the shrinkage of the insulation layer during drying and film-forming, while the current collector hardly shrinks. A great difference between shrinkage rates of the insulation layer and the current collector will lead to a large area of the insulation layer falling off the substrate of the current collector.

Figure 6:
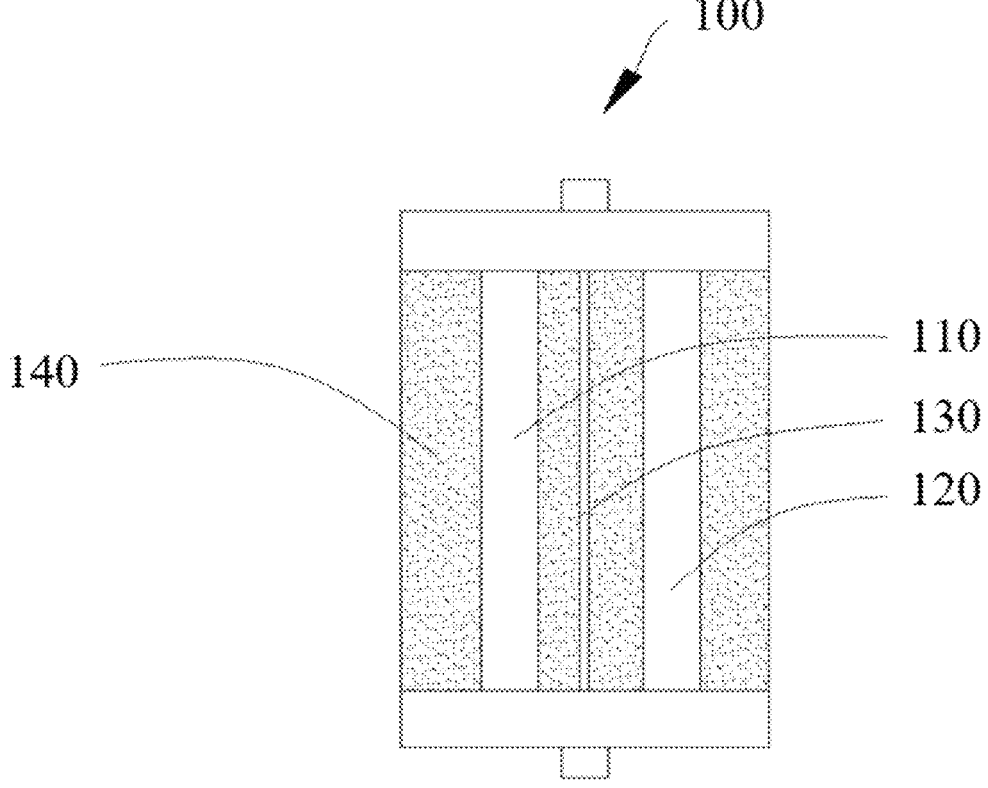
FIG. 6 is a schematic structural view of an electrochemical apparatus provided in an embodiment of the disclosure.

Additionally, the disclosure further provides an electrochemical apparatus 100. Reference is made to FIG. 6, which is a schematic structural view of an electrochemical apparatus provided in an embodiment of the disclosure. The electrochemical apparatus 100 includes a positive electrode 110, a negative electrode 120, a separator 130, and an electrolyte 140. The positive electrode 110 and/or the negative electrode 120 is the aforementioned electrode. The electrochemical apparatus 100 of the disclosure may be a capacitor, a primary battery, or a secondary battery. For example, the electrochemical apparatus 100 may be a lithium-ion capacitor, a lithium battery, a lithium-ion battery, etc. The disclosure does not limit the type of electrochemical apparatus 100.

The disclosure does not specifically limit the type of the separator 130 in the electrochemical apparatus, which can be selected according to actual needs. Specifically, the separator 130 may be selected from at least one of polyethylene, polypropylene, polyvinylidene fluoride, and polymethyl methacrylate, etc.

The electrolyte 140 may be at least one member selected from the group consisting of a gel electrolyte, a solid electrolyte, and an electrolyte solution. Taking a lithium-ion battery as an example, the electrolyte 140 includes a lithium salt and a non-aqueous organic solvent. The lithium salt may include at least one of lithium hexafluorophosphate ($LiPF_6$), lithium bis(trifluoromethanesulfonyl)imide (LiTFSI), lithium trifluoromethanesulfonate, lithium bis(fluorosulfonyl)imide (LiFSI), lithium tetrafluoroborate ($LiBF_4$), lithium bis(oxalato)borate (LiBOB), lithium difluoro(oxalato)borate (LiODFB), and lithium perchlorate, etc. The non-aqueous organic solvent may include at least one of dimethyl carbonate (DMC), diethyl carbonate (DEC), ethyl methyl carbonate (EMC), ethylene carbonate (EC), propylene carbonate (PC), methyl acetate (MA), ethyl acetate (EA), ethyl propionate (EP), propyl propionate (PP), and ethyl butyrate (EB), etc.

The disclosure will be further described below in conjunction with embodiments. It should be understood that, the embodiments provided in the disclosure are only intended to help understanding the disclosure and should not be construed as specific limitations to the disclosure. In the embodiments, only the case where the electrochemical apparatus is a lithium-ion battery is illustrated, but the disclosure is not limited thereto.

For ease of understanding the disclosure, the following embodiments are listed. It should be clear to those skilled in the art that unspecified specific conditions in the embodiments are conducted under conventional conditions or conditions recommended by manufacturers. Reagents or instruments for which the manufacturer is not specified are conventional products that can be obtained through commercial purchase.

The insulation layer slurries in embodiments 1-9 and comparative embodiment 2 are prepared according to the following method.

A water-based binder and an inorganic material are mixed, followed by the addition of deionized water. The mixture is evenly stirred until a slurry has a stable viscosity, and then an insulation layer slurry with a solid content of 10-40% is obtained. The insulation layer slurry is poured into an edge coating buffer tank of an extrusion coater. The weight-average molecular weight of the water-based binder is 400,000-900,000. The average particle size D50 of the inorganic material is 0.8-3.0 μm. The specific types and contents of the water-based binder and inorganic material are illustrated in table 1.

The insulation layer slurry in comparative embodiment 1 is prepared according to the following method.

PVDF and boehmite are mixed at a mass ratio of 8%:92%, followed by the addition of NMP. The mixture is evenly stirred until a slurry has a stable viscosity, and then an insulation layer slurry with a solid content of 10-40% is obtained. The weight-average molecular weight of the PVDF is 900,000-1,200,000. The average particle size D50 of the boehmite is 0.8-3.0 μm.

In the disclosure, for the purpose of illustration, the electrode as a positive electrode is taken for example. The positive electrodes in embodiments 1-9 and comparative embodiment 2 are all prepared according to the following method.

Lithium iron phosphate (as the positive active material), methacrylic acid (as the binder), and Super-P (as the conductive agent) are mixed at a mass ratio of 97:2:1, and deionized water is added as a solvent. The mixture is stirred and dispersed using a 30 L dual planetary mixer to obtain a positive electrode slurry with a solid content of 65%. The positive electrode slurry and an insulation layer slurry are coated using a 30 L extrusion coater to produce an electrode with an areal density of 195 $g/m^2$. The electrode has a film width of 150±0.5 mm and an edge coating width of 8±0.3 mm. The prepared electrode is the same as the recycled positive electrode. In order to better test the peel strength of the electrodes with different edge coatings, various types of insulation layer slurries are coated on aluminum foils using a 100 mm scraper in a blade coating manner. After being roasted in an oven, edge coating electrodes having a width of 100±0.5 mm are obtained.

The positive electrode in comparative embodiment 1 is prepared according to the following method.

Lithium iron phosphate (as the positive active material), methacrylic acid (as the binder), and Super-P (as the conductive agent) are mixed at a mass ratio of 97:2:1, and the deionized water is added as a solvent. The mixture is stirred and dispersed using a 30 L dual planetary mixer to obtain a positive electrode slurry with a solid content of 65%. The positive electrode slurry and an insulation layer slurry are coated using a 30 L extrusion coater to produce an electrode with an areal density of 195 $g/m^2$. The electrode has a film width of 150±0.5 mm and an edge coating width of 8±0.3 mm. The prepared electrode is the same as the recycled positive electrode. In order to better test the peel strength of the electrodes with edge coating, the insulation layer slurry is coated on aluminum foil using a 100 mm scraper in a blade coating manner. After being roasted in an oven, edge coating electrodes having a width of 100±0.5 mm are obtained.

The specific types and contents of the water-based binders and the inorganic materials in the insulation layers of embodiments 1-9 and comparative embodiments 1-2, as well as the thicknesses of the insulation layers of embodiments 1-9 and comparative embodiments 1-2, are illustrated in table 1. In table 1, the contents of the water-based binders and the inorganic materials are expressed as mass percentages calculated based on the total mass of the insulation layers.

TABLE 1

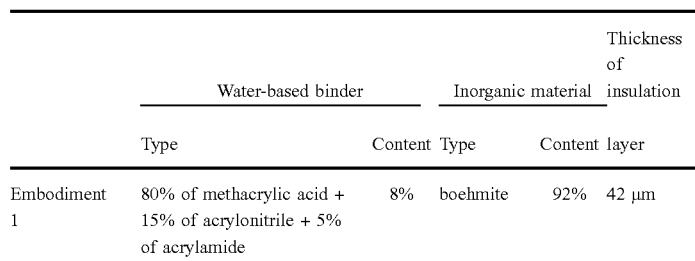

| | Water-based binder | | Inorganic material | | Thickness of insulation |
| | Type | Content | Type | Content | layer |
| --- | --- | --- | --- | --- | --- |
| Embodiment 1 | 80% of methacrylic acid + 15% of acrylonitrile + 5% of acrylamide | 8% | boehmite | 92% | 42 μm |

TABLE 1-continued

| | Water-based binder | | Inorganic material | | Thickness of insulation layer |
| | Type | Content | Type | Content | |
|---|---|---|---|---|---|
| Embodiment 2 | 50% of methacrylic acid + 15% of acrylonitrile + 5% of acrylamide + 30% ethyl acrylate | 8% | boehmite | 92% | 43 μm |
| Embodiment 3 | 30% of methacrylic acid + 15% of acrylonitrile + 5% of acrylamide + 50% ethyl acrylate | 8% | boehmite | 92% | 41 μm |
| Embodiment 4 | 80% of methacrylic acid + 15% of acrylonitrile + 5% of acrylamide | 8% | insulating carbon black | 92% | 43 μm |
| Embodiment 5 | 80% of methacrylic acid + 15% of acrylonitrile + 5% of acrylamide | 8% | boehmite | 92% | 60 μm |
| Embodiment 6 | 80% of methacrylic acid + 15% of acrylonitrile + 5% of acrylamide | 8% | boehmite | 92% | 80 μm |
| Embodiment 7 | 80% of methacrylic acid + 15% of acrylonitrile + 5% of acrylamide | 8% | boehmite | 92% | 100 μm |
| Embodiment 8 | 80% of methacrylic acid + 15% of acrylonitrile + 5% of acrylamide | 10% | boehmite | 90% | 45 μm |
| Embodiment 9 | 80% of methacrylic acid + 15% of acrylonitrile + 5% of acrylamide | 15% | boehmite | 85% | 44μm |
| Comparative embodiment 1 | PVDF | 8% | boehmite | 92% | 44 μm |
| Comparative embodiment 2 | 80% of methacrylic acid + 15% of acrylonitrile + 5% of acrylamide | 25% | boehmite | 75% | 45 μm |

The preset temperature being 25° C. is taken as an example. The insulation layers prepared in embodiments 1-9 and comparative embodiments 1-2 are respectively subjected to initial peel strength test and peel strength test after water immersion. It may be understood that, the initial peel strength refers to the peel strength of a freshly prepared electrode. The peel strength test method may be as follows. The obtained edge coating electrode is cut into strip-shaped electrode using a 15*150 mm blade die. A GOTECH™ tensile testing machine is used for 180° peeling with a peeling length of 100 mm. The peel strength is obtained after completing the test. Before testing the peel strength of the edge coating electrode after being immersed in water, surface water of the edge coating electrode is absorbed with air-laid paper, and then the test is performed according to the above method.

Table 2 illustrates the test results of initial peel strength and peel strength after water immersion at 25° C. between current collectors and insulation layers in the positive electrodes prepared in embodiments 1-9 and comparative embodiments 1-2.

TABLE 2

| | Initial peel strength (N/m) | Peel strength after being immersed in water for 1 min at 25° C. (N/m) | Peel strength after being immersed in water for 3 min at 25° C. (N/m) | Peel strength after being immersed in water for 5 min at 25° C. (N/m) |
|---|---|---|---|---|
| Embodiment 1 | 82.3 | unable to test, can be erased by slightly applying a force | unable to test, can be peeled off by slightly scrubbing | unable to test, can be peeled off by slightly scrubbing |
| Embodiment 2 | 60.4 | 3.3 | 2.3 | 2. |
| Embodiment 3 | 29.1 | 4.5 | 3.1 | 2.9 |
| Embodiment 4 | 80.4 | unable to test, can be erased by slightly applying a force | unable to test, can be peeled off by slightly scrubbing | unable to test, can be peeled off by slightly scrubbing |

TABLE 2-continued

|  | Initial peel strength (N/m) | Peel strength after being immersed in water for 1 min at 25° C. (N/m) | Peel strength after being immersed in water for 3 min at 25° C. (N/m) | Peel strength after being immersed in water for 5 min at 25° C. (N/m) |
|---|---|---|---|---|
| Embodiment 5 | 100.4 | 1.1 | unable to test, can be erased by slightly applying a force | unable to test, can be peeled off by slightly scrubbing |
| Embodiment 6 | 114.5 | 3.4 | 2.1 | 2.1 |
| Embodiment 7 | 60.3 | 3.5 | 3.2 | 3.2 |
| Embodiment 8 | 83.3 | 2.3 | 1.5 | unable to test, can be erased by slightly applying a force |
| Embodiment 9 | 90 | 2.9 | 2.5 | 1.5 |
| Comparative embodiment 1 | 11.2 | 10.8 | 10.2 | 10.1 |
| Comparative embodiment 2 | brittle and cracked | / | / | / |

Analysis of data in table 2 reveals that compared with other embodiments, comparative embodiment 1 showed lower initial peel strength between the current collector and the insulation layer, yet higher peel strength after water immersion at 25° C. Notably, comparative embodiment 1 exhibits almost no change in initial peel strength and peel strength after water immersion of the current collector and the insulation layer. The possible reason is that the PVDF is the binder and the NMP is the solvent, and both of them exhibit lipophilicity, which means they are difficult to be dissolved in water. Therefore, even after 5 minutes of water immersion at 25° C., it remains difficult to peel off the insulation layer from the current collector. In contrast, in embodiments 1-9 all demonstrate peel strengths less than or equal to 7N/m after 1 minute of water immersion at 25° C. Furthermore, it could be said that embodiments 1-9 almost all demonstrate peel strengths less than or equal to 4N/m after 1 minute of water immersion at 25° C. It may be seen that a simple water immersion can easily achieve peeling of the insulation layer from the current collector. This is because the hydrophilic groups in the water-based binder possess similarity and compatibility with water, which allows the water-based binder in the insulation layer to be effectively dissolved in water. Therefore, an efficient recycling of the current collector may be achieved through a simple water immersion, and the recycling rate of the current collector is relatively high. Moreover, the entire recycling process is cost-effective and environmentally friendly. Therefore, the recycling rate of the electrode prepared in the disclosure is high.

Moreover, analysis of data in table 2 shows that the initial peel strength of the insulation layer can reach 20-120N/m, indicating that the water-based binder used in the disclosure has excellent bonding effects. It may be understood that, the content of the water-based binder affects both the initial peel strength and the peel strength after water immersion. As can be seen in embodiments 1-9 and comparative embodiment 2, a preferred content of the water-based binder is 8-20%. In comparative embodiment 2, when the content of the water-based binder is greater than 20%, the initial peel strength became untestable due to high viscosity of the water-based binder. High viscosity of the water-based binder may intensify shrinkage of the insulation layer during drying and film-forming, while the current collector hardly shrinks. Shrinkage rates of the insulation layer and the current collector vary greatly. As a result, a large area of the insulation layer falls off the substrate of the current collector, making the initial peel strength became untestable.

Analysis of data in table 2 reveals that the difference of the inorganic material may affect the peeling effects after water immersion. Boehmite as the inorganic material can achieve easier peeling after water immersion, while insulating carbon black as the inorganic material requires slightly extends immersion time, but the difference between the peel strengths is minimal. The ester compound monomer in the water-based binder is preferred to be kept in a smaller amount. When the proportion of the ester compound monomer in the water-based binder exceed 30% and the additive amount of the water-based binder is not changed, easy peeling through direct scrubbing is unable to be achieved after water immersion at 25° C. The initial peel strength of the current collector and the insulation layer first increases then decreases with the increase of thickness of the insulation layer. When the thickness of the insulation layer exceeds 80 μm, the initial peel strength starts to decrease. Additionally, analysis of data in table 2 reveals that immersion duration has a certain effect on the peel strength. In general, the peel strength between the current collector and the insulation layer after water immersion is inversely correlated with the immersion duration. A longer immersion duration corresponds to a lower peel strength between the current collector and the insulation layer, but the difference between the peel strengths is minimal. It may be seen that, during the recycling process of the electrode of the disclosure, after 1 minute of water immersion at 25° C., the insulation layer may be easily peeled off from the current collector, thereby achieving a simple and efficient recycling of the current collector.

In conclusion, the insulation layer of the disclosure contains the water-based binder. During the recycling process of the electrode, the mechanism of the hydrophilic groups in the water-based binder possessing similarity and compatibility with the water may be leveraged. In this way, easy peeling of the insulation layer from the current collector after 1 minute of water immersion at a preset temperature may be achieved, and the peel strengths of the current collector and the insulation layer both are less than or equal to 7N/m. That is, a simple water immersion enables a highly efficient recycling of the current collector, and the recycling rate of the current collector is relatively high. Moreover, the entire recycling process is cost-effective and environmentally friendly. Therefore, the electrode and the electrochemical apparatus prepared in the disclosure have high recycling rate and are environmental friendly.

Finally, it should be noted that the foregoing embodiments are merely intended for describing the technical solutions of the disclosure but not intended as a limitation on the protection scope of the disclosure. Although the disclosure is described in detail with reference to preferred embodiments, those of ordinary skill in the art understand that modifications or equivalent replacements may be made to the technical solutions of the disclosure without departing from the essence and scope of the technical solutions of the disclosure.

What is claimed is:

1. An electrode, comprising:
a current collector;
an active layer, coated on at least one surface of the current collector;
an insulation layer, coated on the at least one surface of the current collector and connected to a periphery of the active layer; and
wherein the insulation layer comprises a water-based binder and an inorganic material, and a peel strength of the insulation layer after being immersed in water for 1 minute at a preset temperature is less than or equal to 7N/m, the preset temperature being 0-40° C.; the water-based binder comprises hydrophilic groups, the insulation layer has a first surface and a second surface facing away from each other, the insulation layer is bonded to the at least one surface of the current collector through the first surface, and at least part of the hydrophilic groups is exposed from the second surface; and a mass percentage of the hydrophilic groups is greater than or equal to 50% of a total mass of the water-based binder.

2. The electrode of claim 1, wherein the active layer comprises a first active layer and a second active layer connected with each other, and part of the insulation layer covers at least part of the second active layer.

3. The electrode of claim 2, wherein the first active layer and the second active layer are arranged along a length direction of the electrode, and a thickness of the second active layer gradually decreases in a direction away from the first active layer.

4. The electrode of claim 2, wherein the first active layer and the second active layer are arranged along a thickness direction of the electrode, the second active layer is connected to the current collector, and the first active layer is away from the current collector.

5. The electrode of claim 1, wherein the water-based binder comprises a polymer formed by polymerizing at least one monomer selected from the group consisting of methyl methacrylate, ethyl methacrylate, acrylonitrile, ethyl acrylate, n-butyl acrylate, acrylamide, N-methylol acrylamide, acetoacetoxyethyl methacrylate, acrylic acid, and acrylate.

6. The electrode of claim 1, wherein the inorganic material comprises at least one member selected from the group consisting of boehmite, aluminum oxide, insulating carbon black, magnesium oxide, silicon oxide, zirconium oxide, and calcium oxide.

7. The electrode of claim 1, wherein a mass percentage of the water-based binder is 8%-20% of a total mass of the insulation layer, and a mass percentage of the inorganic material is 80%-92%.

8. The electrode of claim 1, wherein a weight average molecular weight of the water-based binder is 400,000-900,000.

9. The electrode of claim 1, wherein an average particle size D50 of the inorganic material is 0.3 μm-20 μm, and D50 is a particle size when a cumulative volume fraction of the inorganic material reaches 50% in a volume-based distribution.

10. The electrode of claim 1, wherein a peel strength of the insulation layer after being immersed in water for 1 minute at 25° C. is less than or equal to 4N/m.

11. An electrochemical apparatus, comprising:
a positive electrode, a negative electrode, a separator, and an electrolyte;
wherein the positive electrode and/or the negative electrode is an electrode comprising:
a current collector;
an active layer, coated on at least one surface of the current collector;
an insulation layer, coated on the at least one surface of the current collector and connected to a periphery of the active layer; and
wherein the insulation layer comprises a water-based binder and an inorganic material, and a peel strength of the insulation layer after being immersed in water for 1 minute at a preset temperature is less than or equal to 7N/m, the preset temperature being 0-40° C.; the water-based binder comprises hydrophilic groups, the insulation layer has a first surface and a second surface facing away from each other, the insulation layer is bonded to the at least one surface of the current collector through the first surface, and at least part of the hydrophilic groups is exposed from the second surface; and a mass percentage of the hydrophilic groups is greater than or equal to 50% of a total mass of the water-based binder.

12. The electrochemical apparatus of claim 11, wherein the active layer comprises a first active layer and a second active layer connected with each other, and part of the insulation layer covers at least part of the second active layer.

13. The electrochemical apparatus of claim 11, wherein the water-based binder comprises a polymer formed by polymerizing at least one monomer selected from the group consisting of methyl methacrylate, ethyl methacrylate, acrylonitrile, ethyl acrylate, n-butyl acrylate, acrylamide, N-methylol acrylamide, acetoacetoxyethyl methacrylate, acrylic acid, and acrylate.

14. The electrochemical apparatus of claim 11, wherein the inorganic material comprises at least one member selected from the group consisting of boehmite, aluminum oxide, insulating carbon black, magnesium oxide, silicon oxide, zirconium oxide, and calcium oxide.

15. The electrochemical apparatus of claim 11, wherein a mass percentage of the water-based binder is 8%-20% of a total mass of the insulation layer, and a mass percentage of the inorganic material is 80%-92%.

16. The electrochemical apparatus of claim 11, wherein a weight average molecular weight of the water-based binder is 400,000-900,000.

17. The electrochemical apparatus of claim 11, wherein an average particle size D50 of the inorganic material is 0.3

μm-20 μm, and D50 is a particle size when a cumulative volume fraction of the inorganic material reaches 50% in a volume-based distribution.

18. The electrochemical apparatus of claim 11, wherein a peel strength of the insulation layer after being immersed in water for 1 minute at 25° C. is less than or equal to 4N/m.

19. The electrochemical apparatus of claim 12, wherein the first active layer and the second active layer are arranged along a length direction of the electrode, and a thickness of the second active layer gradually decreases in a direction away from the first active layer.

20. The electrochemical apparatus of claim 12, wherein the first active layer and the second active layer are arranged along a thickness direction of the electrode, the second active layer is connected to the current collector, and the first active layer is away from the current collector.

* * * * *